United States Patent [19]

Conradsen et al.

[11] 4,064,276
[45] Dec. 20, 1977

[54] PROCESS FOR THE PRODUCTION OF AMMONIATED STRAW AND OTHER PLANT MATERIALS CONTAINING LIGNOCELLULOSE

[75] Inventors: Arne Conradsen, Heistad; Ole Hannibal Lie, Porsgrunn, both of Norway

[73] Assignee: Worsk Hydro a.s, Oslo, Norway

[21] Appl. No.: 711,684

[22] Filed: Aug. 4, 1976

[51] Int. Cl.$^2$ .............................................. A23K 1/22
[52] U.S. Cl. .................................... 426/69; 426/419; 426/636; 426/807
[58] Field of Search .................. 52/3, 4; 426/69, 419, 426/635, 636, 805, 807; 71/23, 54, 64 G

[56] References Cited

FOREIGN PATENT DOCUMENTS 206,996  1955  Australia ............................. 426/636

Primary Examiner—R. B. Penland
Attorney, Agent, or Firm—Wenderoth, Lind & Ponack

[57] ABSTRACT

A process for the ammoniation of straw and other plant materials containing lignocellulose with a dry matter content of at least 60%, utilizing anhydrous ammonia, preferably in liquid form. The plant material is covered by a gas impervious material and ammonia is added in excess of the amount needed for optimal irreversible nitrogen binding, preferably from 20–35 kg $NH_3$/ton dry matter, without application of external heat and pressure. The ammonia impregnated material is left at ambient temperature for at least 10 days, whereafter it is vented and ready for use. The preferred use of the ammoniated straw is as an animal feed.

3 Claims, 4 Drawing Figures

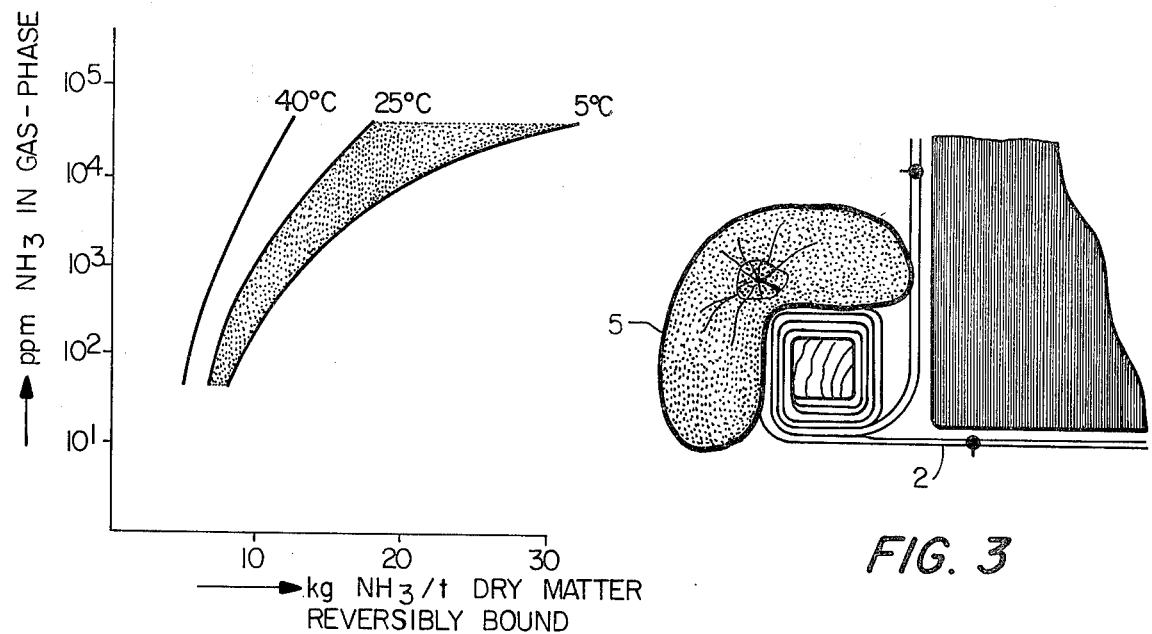
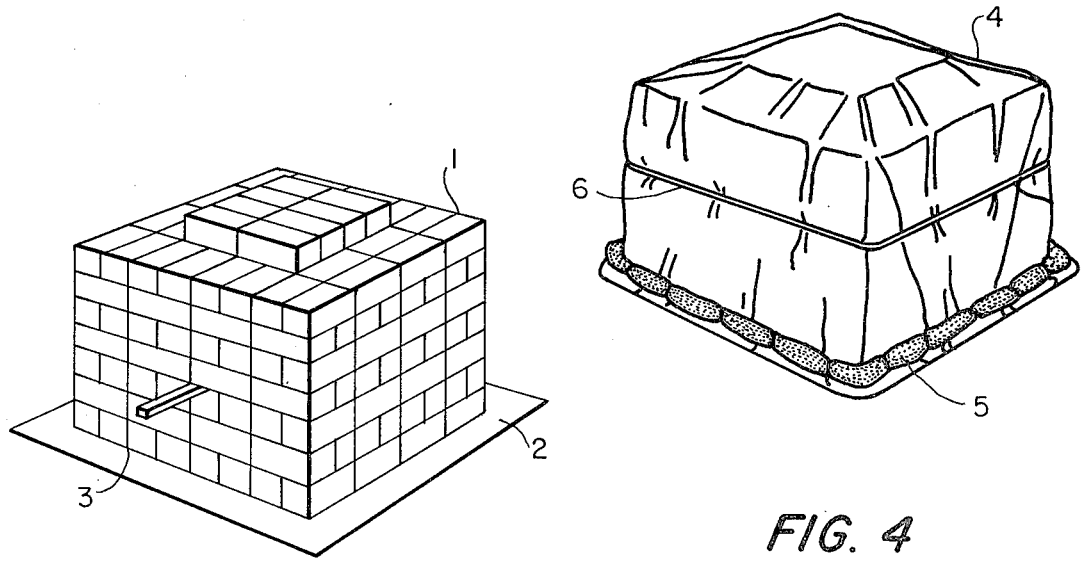

PROCESS FOR THE PRODUCTION OF AMMONIATED STRAW AND OTHER PLANT MATERIALS CONTAINING LIGNOCELLULOSE

BACKGROUND OF THE INVENTION

1. Field of Invention

The present invention relates to a new and improved process for treating straw and other lignocellulose containing plant material with anhydrous ammonia to improve the nutritional value of the material.

2. Description of the Prior Art

During the years extensive tests have been carried out with the ammoniation of plant material to increase its nutritional value. So far this has not resulted in a satisfactory, economical feasible process which is compatible with the well known Beckmann wet leaching method utilizing caustic alkali (NaOH).

A process for ammoniation of agricultural plant material, such as sugar beet pulp and silage, is described in U.S. Pat. No. 2,293,845, H. C. Millar. The material to be treated is transferred to a heated autoclav and ammoniation with anhydrous gaseous ammonia is carried out under elevated temperature and superatmospheric conditions. The treatment will normally last from 15 minutes to 3 hours. A later patent, Norwegian Pat. No. 97581, Flemming Junker, relates to a somewhat similar process and specifies temperatures of preferably 60°–100° C for the ammoniation treatment under pressure.

Utilizing ammonia under superatmospheric pressures and elevated temperatures, will according to the patent give practically speaking a total dissolution (decomposition) of the lignocellulose in the material.

These prior known methods thus require the use of relatively complicated and expensive pressure apparatus and heating equipment.

The prior art discloses that ammoniation by atmospheric pressure and ambient temperatures has also been investigated. According to British Pat. No. 1,280,922 a number of tests were carried out to determine how the ammonia could be intimately and substantially uniformly distributed into the plant material. A series of preliminary tests were carried out on plant material in the form of whole corn plants cut into smaller chops and having a dry matter content of about 45 percent. The chopped material was introduced into a large plastic bag contained inside an outer drum and ammonia was injected, after the air had been evacuated. The plant material in the drum then was stored for 4 months at room temperature.

It was found that the incorporation of ammonia by such a method was not uniform, and this was particularly noticable at higher nitrogen levels.

Consequently the preferred method of ammoniating at normal pressures and room temperatures was to add ammonia to the plant material in the form of an aqeous solution.

Further Junker, in Norwegian Pat. No. 97581, claims that ammoniation by atmospheric pressure and without a specific heat treatment has serious drawbacks and that the elimination of pressure apparatus will give only 50–60% of the desirable alkali binding and accompanying increase in digestibility.

Accordingly there does not so far exist a practical dry method for the ammoniation of straw and other plant materials containing lignocellulose working at atmospheric pressures and ambient temperatures.

SUMMARY OF THE INVENTION

The main object of the present invention is to provide a simple and inexpensive process for the ammoniation of plant material which can be directly applicable and utilized on individual farms and farmyards, requiring a minimum of investments. A further object of the invention is to provide a palatable product with satisfactory digestibility and improved nutritional value.

Another object of the invention is to provide a process which minimizes adverse environmental effects and effluents.

All these objects are obtained with the process according to the present invention where an assembly of straw or other plant material containing not less than 60 weight-percent dry vegetable matter is covered by a gas impervious material, and anhydrous ammonia is added in amounts excessive of the sum of the amount required for optimal irreversible nitrogen binding and the amount of reversibly bound nitrogen remaining in the straw after venting, and where the ammonia impregnated material is left at ambient temperature for a period of at least 10 days.

We have found a surprisingly strong affinity between ammonia and straw with a dry matter content of at least 60 weight percent. At normal pressure and ambient temperatures such straw is able to absorb ammonia in great excess of the amount required to obtain optimal, irreversible nitrogen binding. The absorbtion is accompanied by a moderate increase in temperature, typically from 20°–40° C. Left at normal pressure and ambient temperature the temperature in the container holding the straw in a short time returns to ambient.

This affinity is so strong that a pile of straw made up from several compressed bales of straw and enclosed in a container will be evenly penetrated by ammonia, even with a local injection of liquid ammonia in one of the bales of compressed straw, the ammonia will shortly afterwards have dispersed evenly into all the material in the pile.

This is against the teachings of the above mentioned British Pat. No. 1,280,922, which states that the ammonia distribution becomes uneven at higher nitrogen levels. We believe that the high dry matter content in connection with the special fibrous structure of the plant material is of prime importance for the even distribution of ammonia. It is probably required for the straw to contain some moisture to get this absorbtion — it has occured in our experiments with moisture contents of from 5–40%.

BRIEF DESCRIPTION OF THE DRAWINGS

The process will now be described in more detail, giving examples of practical embodiments and also with reference to the accompanying drawings, wherein:

FIG. 1 shows equilibrium curves for reversibly bound nitrogen plotted against ppm of ammonia in the gasphase.

FIG. 2 shows a pile of straw ready for final covering.

FIG. 3 shows in detail the gas tight closing.

FIG. 4 shows a final straw container after the ammonia has been added.

DETAILED DESCRIPTION OF THE INVENTION

The total ammonia uptake is below referred to as irreversbly bound nitrogen and reversibly bound nitrogen.

The irreversibly bound nitrogen is measured as the increase in raw-protein-N (determined by Kjeldahl analysis).

In addition to the irreversibly bound nitrogen, the straw also absorbs ammonia in the form of more lightly bound or reversibly bound nitrogen. Some of the reversibly bound nitrogen will remain in the straw after venting, but can be removed by raising the temperature or by destillation using a basic medium to strip off the ammonia.

When a container with straw is charged with ammonia the ammonia will be rapidly absorbed. As time passes part of the absorbed ammonia will react with the straw and become irreversibly bound.

The reaction mechanism may be illustrated as follows:

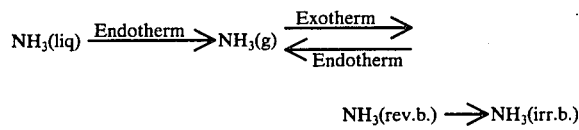

$$NH_3(rev.b.) \longrightarrow NH_3(irr.b.)$$

The amount of irreversibly bound nitrogen will depend upon the amount of reversibly bound nitrogen, and an increase in the amount of reversibly bound nitrogen above a given threshold value, as explained below, will provide a driving force promoting optimal, irreversible nitrogen binding.

The partial pressure of ammonia in a container filled with straw is initially high if gaseous ammonia is used, and low if liquid ammonia is used. This of course, is because liquid ammonia is evaporated gradually. In a relatively short time, however, the partial pressure of ammonia in the container, in both cases approaches some constant value, depending on temperature, amount of ammonia added, and moisture content of the straw. Typically, at 5°–10° C and with addition of 30 kg $NH_3$/ton straw dry matter, the equilibrium partial pressure is 2–5 percent by volume, which is an unexpectedly low value.

The amount of irreversibly bound nitrogen in untreated straws varies normally in the range from 0.5–1.0% abs. Optimal irreversibly bound nitrogen after treatment varies normally in the range from 1.0–2.0% abs. When treatment is to be finished, excess ammonia is vented off. The desorbtion of ammonia is accompanied by a temperature drop. Even after extensive ventilation where there is hardly a faint smell of ammonia from the straw, there is still present a substantial amount of reversibly bound nitrogen in the straw.

Typically, this reversibly bound nitrogen amounts to about 0.5–0.7% N abs. at temperatures from 5°–25° C. This is illustrated by the equilibrium curves shown in FIG. 1. To ammonia treated straw containing optimal amounts of irreversible bound nitrogen, was added varying amounts of fresh ammonia and the amount of ammonia in gas-phase (ppm) was plotted against reversibly bound ammonia (kg $NH_3$/ton straw) after the equilibrium stage was reached. These measurements are rather complicated, but as shown in FIG. 1 the resultant curves at 5° and 25° C are converging towards a minimum value of approximately 6–8 kg $NH_3$/ton straw dry matter. Thus, at normal outdoor temperatures there will always be a substantial amount of ammonia in the form of reversibly bound nitrogen which can not be driven off by conventional venting.

This ammonia is according to the present invention not stripped off. In this way we obtain a combined or in fact a synergistic effect, optimal irreversible nitrogen binding is secured and simultaneously also an improved nutritional value is obtained.

As long as the lightly bound ammonia is present in amounts above the recorded threshold value of approximately 6–8 kg $NH_3$/ton straw dry matter, there will be present a driving force to promote irreversible nitrogen binding.

Even if most of the increase in nitrogen binding may be obtained in a few days, 10 days or less, the improvement in nutritional value may go on for a long time as long as the driving force is present. Several weeks, eight weeks or more, is sometimes needed to obtain the full effect when the amount of ammonia added is just above the calculated, theoretical value shown below.

The threshold amount of ammonia to be used may be calculated as follows:

| | |
|---|---|
| Irreversibly bound-N (raw protein) 1.0% abs | = 10 kg N/ton straw dry matter |
| Reversibly bound-N after venting | = 7 kg N/ton straw dry matter |
| Total | = 17 kg N/ton straw dry matter |
| In terms of $NH_3$ (17/0.8) | = 21 kg $NH_3$/ton straw dry matter |

The total amount of ammonia added should thus exceed 21 kg $NH_3$/ton straw dry matter to secure the driving force to obtain an increase of 1.0% abs. in raw protein N within a reasonable time.

Satisfactory results are obtained within 3–8 weeks with amounts of from 20–30 kg $NH_3$/ton straw dry matter, 20–35 kg $NH_3$/ton straw dry matter are considered as the preferred amounts, but even greater amounts of ammonia, such as 40 kg $NH_3$/ton straw dry matter or more, can be used. However, the waste of ammonia will then be considerable, unless a recovery system is used, which greatly increases the cost.

All common types of straw or other lignocellulose containing material can be used either as it is or chopped to smaller pieces. Baled straw is preferred due to its higher density, which gives more straw per unit volume.

Concerning the container, there are no requirements for rigidity and strength to withstand heat and high pressures. For economic reasons plastic foil is preferred. Plastic foils have relatively high ammonia permeability, but, because of the low partial pressures of ammonia in the container, according to the present invention, the ammonia losses through the foils are negligible. To obtain satisfactory mechanical strength, foil thickness of 0.1–0.25 mm is normally used. Polyethylene foil is the cheapest and the least permeable. PVC foil can also be used, but this material has been found to have higher $NH_3$-permeability and is more expensive. Any material may be used to contain the straw as long as it is reasonably inert and impervious to ammonia.

A practical way of introducing the ammonia is in liquid form and concentrated within one area of the material to be treated. This gives even penetration and the partial gas-pressure and ammonia gas concentrations will be kept so low that hazards of explosive gas concentrations will practically be eliminated.

Any shape and size of pile and container can be used. The straw can also be directly collected from the harvester and filled into plastic cylinders, bags or the like.

IN VIVO FEED TESTS

In vivo digestibility and nutritional value experiments have been carried out on sheep. So far the results from 30 single tests have been evaluated giving the following average results:

Dry matter digestibility is increased from 49 to 62.

The nutritional value is increased from 4.2 to 2.4 kg straw per feed unit.

These results are very positive and the substantial improvement in nutritional value seems to confirm that the reversibly bound ammonia is also utilized by the animals.

EXAMPLE

Piles in the form of prisms were made up from bales of straw 1 placed on top of a sheet of plastic foil 2 placed on the ground, cfr. FIG. 2. The prism form is preferred due to low surface to volume ratio.

Between the bales 1 was placed a stick 3, which later was retracted to give access for a pipe for the introduction of ammonia. After the piles had been completed, the amount of straw varied from 800–6000 kg. After the piles had been completed an upper plastic foil 4 was folded around the pile and rolled together with the bottom foil — FIGS. 3 and 4 — and kept closed with the help of sand bags 5, weights or the like. Liquid ammonia was added through a perforated pipe, which was pushed into the pile after the stick 3 was retracted. The plastic foil cover was kept open in one end, while liquid ammonia was added at the far end. Some of the air present in the pile was pushed out through the opening as the liquid ammonia evaporated. Due to the strong affinity of ammonia to the straw, negligible amounts of ammonia escaped through the opening. After addition of 20–35 kg $NH_3$/ton straw the opening was closed and the pile tied with string 6 — FIG. 4. After 3–8 weeks the piles were vented and the straw ready for use.

By adding liquid ammonia in the far end of the pile, there will be no problems with $NH_3$-fumes for the operator. Liquid $NH_3$ should also be added high up in the pile to facilitate evaporation and spreading, and to avoid accumulation of liquid $NH_3$ on the bottom foil.

We claim:

1. A process for the production of ammoniated straw to increase the nutritional value of the material said process comprising:

forming masses of compressed straw having a dry matter content of at least 60% by weight into a pile;

covering the top, bottom and sides of said pile with plastic foil;

adding 15–40 kg of anhydrous ammonia per ton of dry straw while allowing entrapped air to escape through a temporary opening in said foil;

and thereafter closing said opening and leaving the covered pile at ambient temperature and atmospheric pressure for a period of at least 10 days to complete the ammoniation treatment.

2. A process as claimed in claim 1, wherein ammonia is added in amounts of from 20–35 kg $NH_3$/ton dry matter plant material.

3. A process as claimed in claim 1, wherein said time period of the ammonia treatment lasts at least 20 days.

* * * * *